Aug. 9, 1960     R. B. POGUE     2,948,361
BRAKE SHOES
Filed Aug. 10, 1956     2 Sheets-Sheet 1
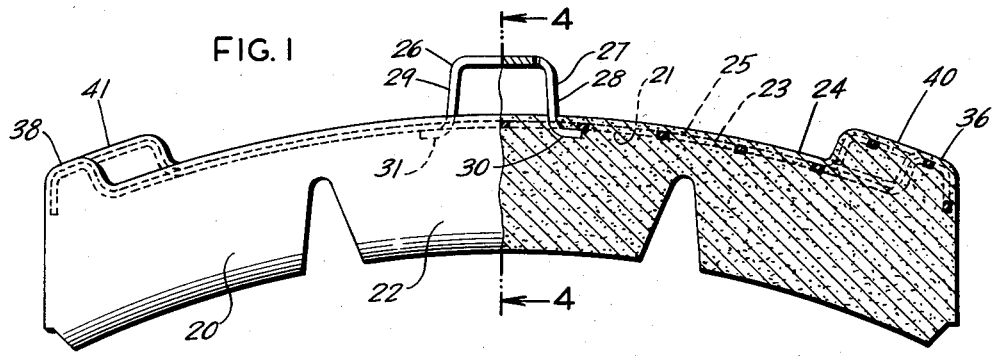
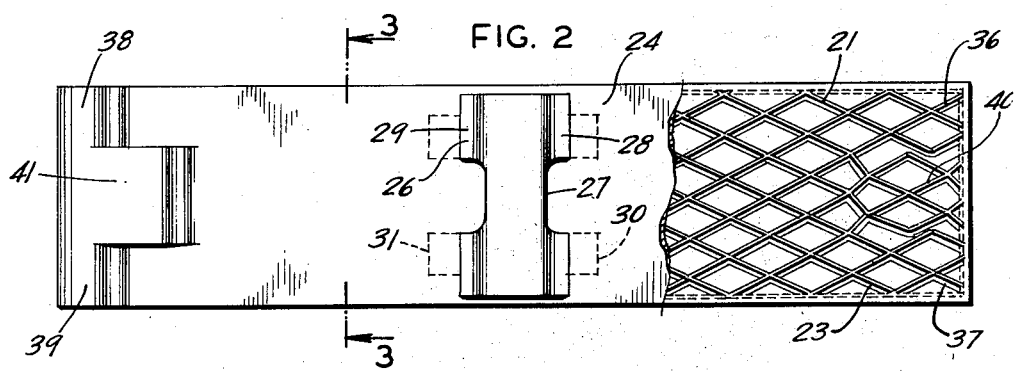
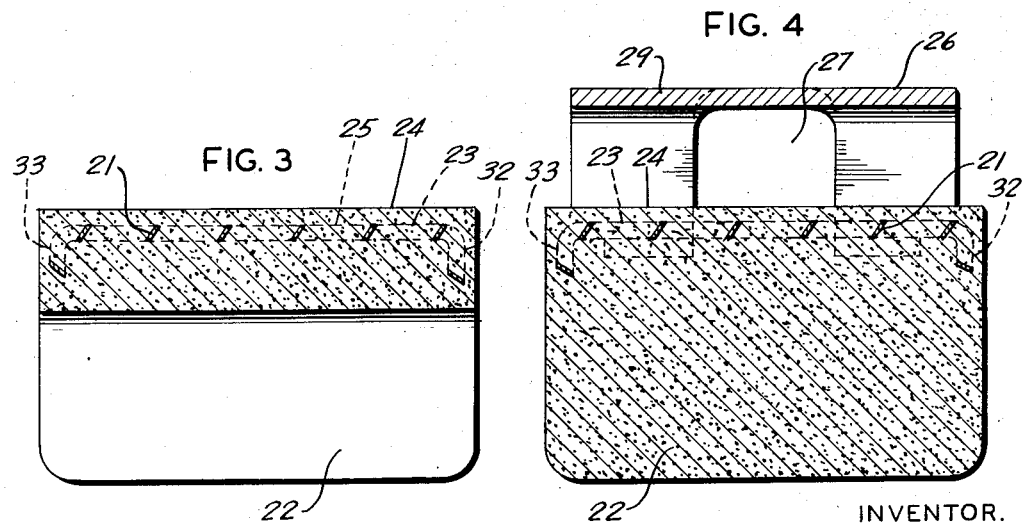
INVENTOR.
ROBERT B. POGUE
BY
ATTORNEYS Aug. 9, 1960 R. B. POGUE 2,948,361
BRAKE SHOES
Filed Aug. 10, 1956 2 Sheets-Sheet 2
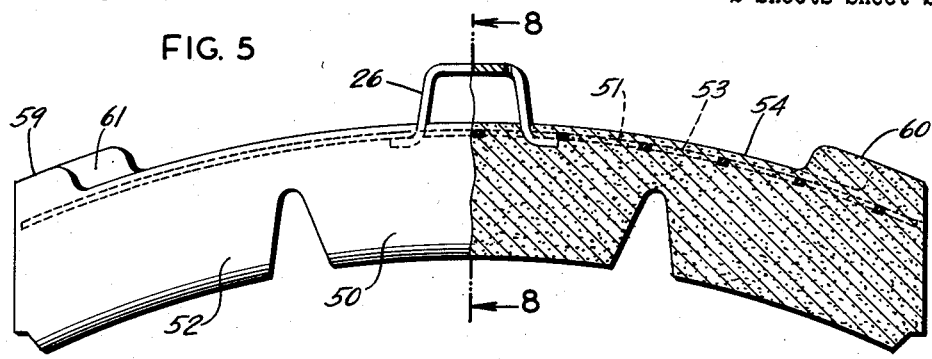
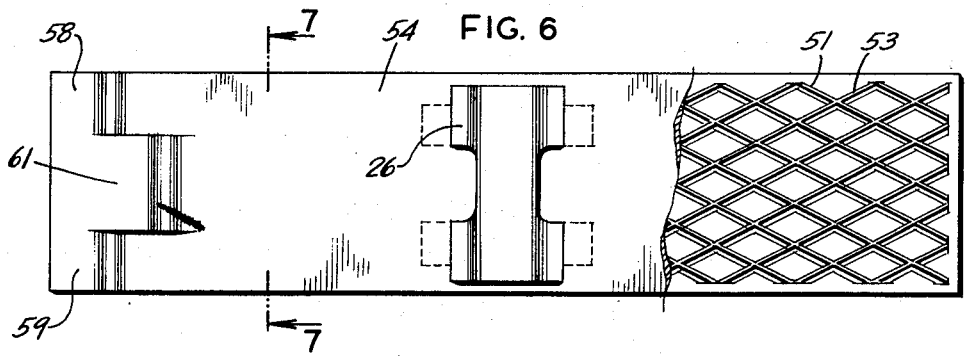
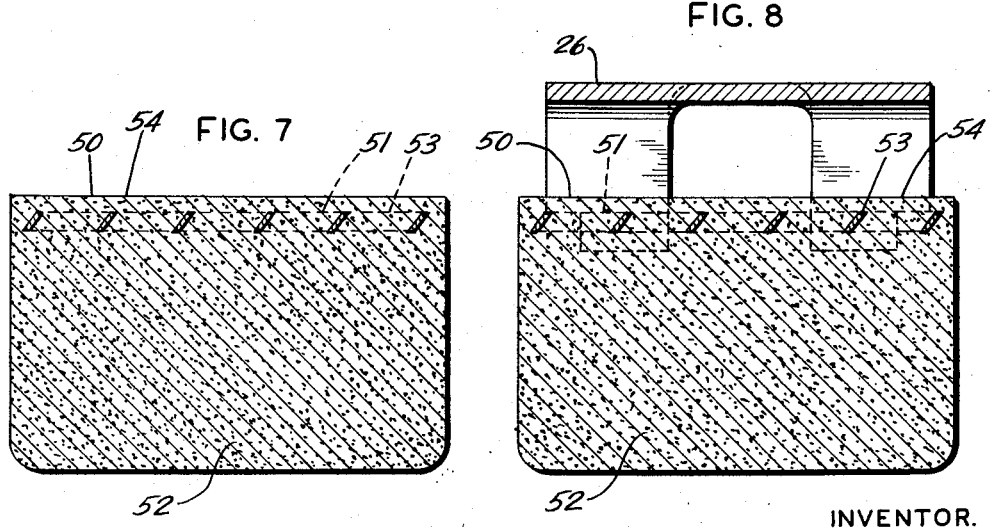
INVENTOR.
ROBERT B. POGUE
BY
*Wallace and Cannon*
ATTORNEYS

2,948,361

Patented Aug. 9, 1960

2,948,361

BRAKE SHOES

Robert B. Pogue, West Orange, N.J., assignor to American Brake Shoe Company, New York, N.Y., a corporation of Delaware Filed Aug. 10, 1956, Ser. No. 603,406

1 Claim. (Cl. 188—251)

This invention relates to a new and improved railroad brake shoe of the type comprising a molded composition body supported upon a metal back structure, and is particularly concerned with a new and improved back structure for a railroad brake shoe of this type.

The brake shoe which has long been standard in the railroad industry comprises a cast iron body having a substantial thickness and having a braking surface which is curved to correspond generally to the curvature of a railroad car or locomotive wheel. A supporting plate or strip of rolled steel is frequently included in the back of the cast iron brake shoe as a reinforcement for the cast iron body. This reinforcing strip also tends to hold the brake shoe body together if it becomes cracked or otherwise fractured; usually, the iron brake shoe body is cast around the reinforcing member to form a unitary structure. A substantially different type of brake shoe which has been considered for use on railroad cars and locomotives comprises a molded composition body which may be supported upon a steel backing plate; this steel backing structure is in some respects similar to the support member of the cast iron type of shoe in that it lends strength and rigidity to the brake shoe body. In the composition type brake shoe, the support lugs and other elements utilized to mount the shoe upon a brake head are usually formed as a part of or comprise separate steel elements mounted on the metal supporting back; in the cast iron type of shoe, the mounting lugs, toe guides, and the like may be cast as a part of the brake shoe body or may be formed as steel members affixed to the aforementioned reinforcing strip.

The composition type brake shoe, which may comprise friction material of one sort or another intimately mixed with a resin and/or rubber binder, provides substantially higher retarding force per unit area than the standard cast iron shoe, since it affords a considerably higher coefficient of friction when brought into contact with the wheel of a car or locomotive than may be obtained with a cast iron shoe. In general, it may be stated that the cast iron shoe is a high-pressure low-friction device, whereas the composition shoe is a high-friction low-pressure device. Accordingly, the composition shoe may be operated at substantially lower braking pressures than the cast iron shoe and permits utilization of smaller brake cylinders. The composition type shoe, however, as known in the art, has several serious disadvantages which have precluded widespread adoption of this type of shoe for railroad service. Among the difficulties presented with the composition shoe, a principal one has been the tendency of the composition body to separate from the metal back or support structure under even relatively mild braking conditions. In particular, this difficulty may be attributed at least in part to the difference in the thermal coefficients of expansion of the brake shoe composition material and the metal back structure. In addition, composition brake shoes of conventional construction may tend to crack and/or to detach from their metal backing structure when subjected to the severe vibration frequently encountered in railroad operations. The flexural forces often encountered in railroad service may also tend to separate the composition brake shoe body from its supporting metal back.

One proposal which has been advanced as a means to strengthen the composition body of a railroad brake shoe contemplates the incorporation of one or more layers of expanded metal into the brake shoe body as a reinforcement; the expanded metal is embedded in the composition material in a portion thereof closely adjacent the metal plate employed as a backing structure for supporting the composition. A composition shoe structure and method of manufacturing this type of composition shoe are described and claimed in an application of William S. Fraula, Erwin R. Knauer, and Raymond E. Spokes, Ser. No. 603,407, now Patent No. 2,911,074, filed concurrently herewith and assigned to the same assignee as the present invention. This type of shoe structure is very satisfactory in service and avoids or minimizes many of the difficulties otherwise encountered in the manufacture and use of composition type railroad brake shoes. Like all conventional composition shoe structures, however, the Fraula et al. construction includes a relatively rigid steel backing structure of the type which has heretofore been considered essential in brake shoes of this type.

It is an object of the invention, therefore, to obtain substantially all of the advantages of a metal-backed composition-type brake shoe reinforced with expanded metal in a structure which is inherently much simpler and more economical than those previously known in the art.

A further object of the invention is a new and improved railroad brake shoe structure of the composition type which inherently affords maximum strength to the composition body and maximum adherence between the composition body and a metal backing structure.

It is a corollary object of the invention to provide a composition type railroad brake shoe construction in which internal reinforcement of the composition body is achieved by means of a structure which also affords a means for mounting the brake shoe upon a brake head.

A railroad brake shoe constructed in accordance with the invention comprises a composition brake body having a predetermined length, width, and thickness and a predetermined longitudinal curvature. The shoe further includes a back member fabricated from heavy gauge metal mesh material, preferably expanded steel, which is embedded in the composition body at a position closely adjacent the convex surface thereof. This back member has a length, width, and curvature approximately corresponding to the length, width, and curvature of the composition body and may be completely immersed within the composition body or may have its convex surface coincident with the convex surface of the composition material. A metal lug member is affixed to the back member and extends through the composition body above the convex surface thereof to afford a means of mounting the brake shoe upon a suitable brake head.

Other and further objects of the present invention will be apparent from the following description and claim and are illustrated in the accompanying drawings which, by way of illustration, shows preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claim.

In the drawings:

Fig. 1 is an elevation view, partly in cross section, of a composition type railroad brake shoe constructed in accordance with one embodiment of the invention;

Fig. 2 is a plan view, partly in cross section, of the brake shoe illustrated in Fig. 1;

Fig. 3 is a sectional view taken along line 3—3 in Fig. 2;

Fig. 4 is a sectional view taken along line 4—4 in Fig. 1;

Fig. 5 is an elevation view, partly in cross section of a composition type railroad brake shoe constructed in accordance with another embodiment of the invention;

Fig. 6 is a plan view of the brake shoe shown in Fig. 5, partly in cross section;

Fig. 7 is a cross sectional view taken along line 7—7 in Fig. 6; and

Fig. 8 is a sectional view taken along line 8—8 in Fig. 5.

The brake shoe 20 illustrated in Fig. 1 comprises a molded composition body 22 which is supported upon a metal backing structure generally indicated at 21. Composition body 22 has a predetermined length, width, and thickness and further has a predetermined curvature along its length which corresponds approximately to the curvature of the wheel of a railroad car or locomotive (not shown) upon which the brake shoe is to be mounted. The terms "composition" and "composition material" as used throughout this specification and in the appended claim refer to a comminuted friction material dispersed in a heat-resistant organic binder such as a resin, a rubber, or a rubber-resin mixture. The composition material employed in manufacturing brake shoe 20 may be of any type suitable for railway braking service. One very satisfactory composition comprises a comminuted friction material, selected from the sillimanite group and related aluminum sillicates, distributed in a heat-stable rubber or rubber-and-resin binder. The friction material, which may include kyanite, sillimanite, andalusite, mullite, topaz, and/or dumortierite, preferably comprises about ten parts by weight of the composition. The binder may comprise any heat-stable synthetic or natural rubber; for example, Buna-S synthetic rubber either with or without an additional liquid polymer has been found quite satisfactory for this purpose. The binder may also include phenolic or other resin binders. An elastomer-base composition of this type, which is described and claimed in the co-pending application of R. E. Spokes et al. Ser. No. 491,510, filed March 1, 1955, now Patent No. 2,901,456, and assigned to the same assignee as the present invention, is preferred because of its superior characteristics with respect to heat and shock resistance. The Spokes et al. composition is also desirable because it affords a favorable ratio of wet to dry coefficients of friction, a highly desirable characteristic in railroad service. In addition to the mineral friction material, the composition may include further friction material in the form of cast iron particles or other suitable materials. It should be expressly understood that the invention is not restricted to any particular composition material and that the foregoing information is set forth solely by way of example of the type of composition contemplated.

Metal backing structure 21 of brake shoe 20 includes two principal elements. One of these is a back member 23 which is fabricated from a heavy-gauge metal mesh and which is embedded within composition body 22 at a position closely adjacent the convex surface 24 thereof. Back member 23 has a length which is approximately equal to the overall length of the brake shoe and has a longitudinal curvature approximately corresponding to that of composition body 22, as indicated in Fig. 1. Moreover, the back member 23 is approximately equal in width to composition body 22, as indicated in Figs. 3 and 4. It should be understood that the dimensional correspondence between back member 23 and composition body 22 need not be exact, although major variations are not desirable; for example, in some applications it may be necessary or desirable to extend composition body 22 somewhat beyond the ends of back member 23 or to make it somewhat wider than the metal back structure.

Back member 23 should be fabricated, as indicated above, from a heavy gauge metal mesh material. An extremely satisfactory and economical material for this purpose is commercially available as a heavy gauge expanded-metal steel mesh; the commercial designation for one satisfactory mesh material is No. 9 gauge expanded steel. The physical appearance and structure of the mesh are perhaps best shown in the sectional portion of Fig. 2. As indicated in Figs. 1 and 2, the composition material extends through each of the mesh openings, completely impregnating the mesh and making it an integral part of the composition body structure. In practice, it is not essential that the convex surface 24 of the composition material be spaced an exact distance from the convex surface 25 of the metal mesh (see Figs. 1 and 3); in some instances, these two surfaces may coincide. For best strength characteristics, however, the composition material completely surrounds the metal mesh as indicated in the drawings.

The second principal element of metal backing structure 21 comprises a center attaching lug 26 which may be utilized to mount brake shoe 20 upon a brake head (not shown). Center attaching lug 26 is preferably fabricated from steel and includes a central longitudinal aperture 27 for receiving a mounting key (not shown) in the usual manner; this keyway is best shown in Fig. 4. The two opposed legs 28 and 29 of lug 26 extend through suitable apertures in back member 23 and are clinched at their extremities 30 and 31 so that the lug is affixed to the metal mesh back member. If desired, lug extensions 30 and 31 may be welded, brazed, or otherwise secured to the mesh backing member, although this is not essential. They should be bent to extend away from the center of the brake shoe in the manner illustrated in order to provide maximum strength and avoid shearing of the lug from the brake shoe when the shoe is subjected to longitudinal stress during braking operations.

The mesh backing member 23 is provided with two flange sections 32 and 33 which engage the side portions of composition body 22 as shown in Figs. 1, 3, and 4. The flanges 32 and 33 strengthen back member 21 and afford somewhat improved adherence between the back member and composition body 22. In addition, back member 23 is bent or otherwise suitably deformed at the ends thereof to define a series of end stops 36, 37, 38, and 39 and a pair of toe guides 40 and 41, as shown in Figs. 1 and 2, the end stops and toe guides being filled with composition material as indicated. The configuration and arrangement of mounting lugs 36—41, as well as attaching lug 26, is conventional; it should be understood, however, that these may be varied to suit the requirements of the particular brake head at which the shoe is to be employed. In this connection, reference should be made to application Serial No. 606,868, filed August 29, 1956, and application Serial No. 606,869, filed August 29, 1956, now Patents Nos. 2,900,711 and 2,902,752, respectively, which describe and claim safety arrangements for use in conjunction with composition type railroad brake shoes to prevent damage which would otherwise be incurred if the composition shoes could be interchanged with standard cast iron shoes.

In manufacturing brake shoe 20, back member 23 is first preferably coated with an incurred coating composition; a preferred composition includes a combination of a rubber, a thermosetting resin, and a suitable solvent. Center lug 26 is affixed to back member 23, either before or after the aforementioned coating step, and the complete metal backing structure 21 is then placed in a suitable mold. The composition material for brake shoe body 22 is then introduced into the mold in uncured form and all of the composition material is then subjected to heat and pressure to cure and harden the composition and form the complete brake shoe. This highly advantageous manufacturing procedure is described in detail in the aforementioned Fraula et al. application.

Brake shoe 20 is highly advantageous as compared with conventional composition-type shoes in that it provides very greatly improved adherence between the reinforcing or backing structure of the shoe and the composition body. Because the composition material of body 22 extends through the many apertures or openings in the metal mesh and effectively encompasses the entire mesh structure, the metal mesh becomes an integral part of the brake shoe body and resists any force tending to separate these two elements. The mesh is strong enough to lend the desired degree of rigidity to the brake shoe body and absorbs the flexural stresses to which the shoe is subjected in railroad service. At the same time, center attaching lug 26 is effectively anchored to back member 23, so that the back member can absorb the stresses to which the shoe is subjected from this direction. Moreover, and of primary importance, is the fact that the combined metal backing structure 21 including mesh 23 and attaching lug 26 is extremely inexpensive as compared with other back structures having comparable operating characteristics.

An even simpler composition brake shoe structure embodying the principles of the invention is shown in Figs. 5–8. The brake shoe 50 shown in these figures includes a composition body 52 which is essentially similar to brake shoe body 22 of Figs. 1–4 and a metal backing structure 51 which is similar to but somewhat different from back structure 21 of the previously described embodiment. Back structure 51 comprises a back member 53 which, like back member 23 of the previously described structure, is fabricated from heavy duty metal mesh material, preferably expanded steel of No. 9 gauge or heavier. Back structure 51 also includes a center attaching lug 26 which may be affixed to back member 53 in the same manner as described hereinabove.

In this embodiment of the invention, however, the metal back structure is somewhat simplified; as indicated in the cross sectional views of Figs. 7 and 8, metal mesh 53 is essentially flat in cross sectional configuration and is not provided with depending flanges. Moreover, as shown in Figs. 5 and 6, back member 53 is not deformed to define the end stops 58 and 59 or the toe guides 60 and 61 of the brake shoe. Rather, the end stops and toe guides are composed entirely of composition material which extends through the steel mesh forming back member 53 to a level substantially higher than the convex surface 54 of the brake shoe body. Of course, it will be understood that additional lug members corresponding to end stops 58 and 59 may be provided at the opposite end of brake shoe 50 and that the configuration and arrangement of these lugs may be varied to suit the brake head upon which the shoe is to be mounted.

The extremely simple construction illustrated in Figs. 5–8 retains most of the advantages of the construction of Figs. 1–4 and is even more economical to fabricate because of the greater simplicity of configuration of back member 53. As in the previously described embodiment, back member 53 provides the requisite structural strength for the brake shoe and serves to unify composition body 52 with center attaching lug 26. For many applications, this simplified structure is fully equivalent to Figs. 1–4. It will readily be understood, of course, that features of the two embodiments may be easily combined; for example, it may be desirable to provide metal-reinforced end mounting lugs of the type described in conjunction with Figs. 1 and 2 in the embodiment of Figs. 5–8 or to utilize the unreinforced end lug structures of Figs. 5 and 6 in a flanged construction of the type shown in Figs. 3 and 4. The substantial structural and economic advantages of the invention, which are predicated upon utilization of the metal mesh back member both for internal strengthening of the composition brake shoe body and for support of the center attaching lug, may be obtained in any of these modifications.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claim.

I claim:

A railroad brake shoe consisting essentially of: a composition brake body having a predetermined length, width, and thickness and having a predetermined longitudinal curvature; a back member consisting of expanded steel mesh embedded in said composition body and limited to a portion of said body closely adjacent the convex surface thereof and having a length, width, and curvature approximately corresponding to the length, width, and curvature of said composition body; a plurality of mounting lug elements each constituting an integral part of said composition brake body and comprising composition material extending above the convex surface thereof; a corresponding number of lug-reinforcing elements each comprising an integral part of said back member deformed to correspond to the configuration of an individual one of said lug members; and a metal lug member, affixed to the concave surface of said back member and extending through said back member and said composition body above the convex surface thereof, for mounting said brake shoe upon a brake head.

References Cited in the file of this patent
UNITED STATES PATENTS

| | | |
|---|---|---|
| 642,318 | Gallagher | Jan. 30, 1900 |
| 1,046,423 | Kinzer | Dec. 3, 1912 |
| 1,136,936 | Chipley | Apr. 27, 1915 |
| 1,158,561 | Sargent | Nov. 2, 1915 |
| 1,159,008 | Jones et al. | Nov. 2, 1915 |
| 1,470,475 | Pettis | Oct. 9, 1923 |
| 1,580,657 | De France | Apr. 13, 1926 |
| 1,924,345 | Blume | Aug. 29, 1933 |